(12) United States Patent
Soldate et al.

(10) Patent No.: US 10,360,604 B2
(45) Date of Patent: *Jul. 23, 2019

(54) APPARATUS AND METHOD OF SCANNING PRODUCTS AND INTERFACING WITH A CUSTOMER'S PERSONAL MOBILE DEVICE

(71) Applicant: Walmart Apollo, LLC, Bentonville, AR (US)

(72) Inventors: David W. Soldate, Sammamish, WA (US); Thomas J. DeMott, Lowell, AR (US); Stephen L. Graves, Garfield, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,373

(22) Filed: Jun. 22, 2018

(65) Prior Publication Data

US 2018/0300779 A1 Oct. 18, 2018

Related U.S. Application Data

(63) Continuation of application No. 15/517,373, filed as application No. PCT/US2015/054381 on Oct. 7, 2015, now Pat. No. 10,032,197.

(Continued)

(51) Int. Cl.
*G06Q 20/20* (2012.01)
*G06Q 30/06* (2012.01)
*H04W 88/02* (2009.01)

(52) U.S. Cl.
CPC ........... *G06Q 30/06* (2013.01); *G06Q 20/208* (2013.01); *H04W 88/02* (2013.01)

(58) Field of Classification Search
CPC ...... G06Q 20/208; G06Q 30/06; H04W 88/02
See application file for complete search history.

(56) References Cited

U.S. PATENT DOCUMENTS 6,484,939 B1 11/2002 Blaeuer
6,910,697 B2 6/2005 Varatharajah
(Continued)

FOREIGN PATENT DOCUMENTS

DE 201004927 1/2002
WO 2016057610 4/2016

OTHER PUBLICATIONS

Filippetti, Jenny; "Smart Shopping Cart by SK Telecom"; https://www.engadget.com/2011/07/27/sk-telecoms-smart-cart-syncs-to-phones-reminds-you-to-buy-milk/; Published on Jul. 28, 2011; 9 pages.

(Continued)

*Primary Examiner* — Seung H Lee
(74) *Attorney, Agent, or Firm* — Fitch, Even, Tabin & Flannery LLP

(57) ABSTRACT

Methods and apparatuses are provided to allow a customer to acquire product information from a scanning system. For example, in some embodiments, a method performed by a control circuit comprises establishing a wireless communication connection between a user's personal mobile device and a portable scanning system configured to optically scan identification codes of distinct products; wirelessly receiving at the mobile device product identifying information from the scanning system of each product scanned by the scanning system and available for purchase at the retail store; associating, at the mobile device, a plurality of the product identifying information received from the scanning system with each of a plurality of user specified product information locally accessible through the mobile device; and communicating from the mobile device to a checkout (Continued)

system, during a checkout process, the product identifying information received from the scanning system of each product scanned by the scanning system.

15 Claims, 5 Drawing Sheets

Related U.S. Application Data

(60) Provisional application No. 62/061,067, filed on Oct. 7, 2014.

(56) References Cited

U.S. PATENT DOCUMENTS

| | | |
|---|---|---|
| 6,937,998 B1 | 8/2005 | Swartz |
| 7,249,212 B2 | 7/2007 | Do |
| 7,487,913 B2 | 2/2009 | Adema |
| 7,648,068 B2 | 1/2010 | Silverbrook |
| 7,828,211 B2 | 11/2010 | Landers |
| 7,934,647 B1 | 5/2011 | Mims |
| 7,990,556 B2 | 8/2011 | King |
| 8,751,316 B1 | 6/2014 | Fletchall |
| 9,230,249 B1 | 1/2016 | Vora |
| 10,032,197 B2 | 7/2018 | Soldate |
| 2004/0111320 A1 | 6/2004 | Schlieffers |
| 2005/0113027 A1 | 5/2005 | Boesen |
| 2008/0308630 A1 | 12/2008 | Bhogal |
| 2011/0112898 A1 | 5/2011 | White |
| 2013/0211953 A1 | 8/2013 | Abraham |
| 2013/0218721 A1 | 8/2013 | Borhan |
| 2014/0214589 A1 | 7/2014 | Pedley |
| 2014/0278524 A1 | 9/2014 | Vaglio |
| 2015/0006319 A1 | 1/2015 | Thomas |
| 2015/0363798 A1 | 12/2015 | Aihara |

OTHER PUBLICATIONS

Hanlon, Mike; "Fujitsu U-Scan Shopper Trolley designed to eliminate checkout queues"; http://newatlas.com/go/4345/; Published on Jul. 29, 2005; 5 Pages.

PCT; App. No. PCT/US2015/054381; International Preliminary Report on Patentability dated Apr. 20, 2017.

PCT; App. No. PCT/US2015/054381; International Search Report and Written Opinion dated Jan. 14, 2016.

U.S. Appl. No. 15/517,373; Notice of Allowance dated Mar. 27, 2018.

U.S. Appl. No. 15/517,373; Office Action dated Oct. 18, 2017.

APPARATUS AND METHOD OF SCANNING PRODUCTS AND INTERFACING WITH A CUSTOMER'S PERSONAL MOBILE DEVICE

RELATED APPLICATION(S)

This application is a continuation of U.S. application Ser. No. 15/517,373, filed Apr. 6, 2017, which was filed in accordance with 35 U.S.C. 371 claiming priority to International Application No. PCT/US2015/054381, with international filing date of Oct. 7, 2015, which claims the benefit of U.S. Provisional Application No. 62/061,067, filed Oct. 7, 2014, all of which are incorporated by reference in their entirety herein.

TECHNICAL FIELD

This invention relates generally to product sales in a retail environment.

BACKGROUND

In a retail environment, a customer's experience at a retail location or store is important to maintaining customer loyalty. Often, customers select products and put them into a cart or basket as they move through the retail store. Upon completing her/his shopping, a customer proceeds to a checkout or payment station. At the checkout station each item selected by the customer is scanned or otherwise identified and a corresponding price is added to the customer's total bill. This typical shopping experience allows a user to obtain desired products but generally fails to provide the user with much in the way of relevant information about her/his shopping.

BRIEF DESCRIPTION OF THE DRAWINGS

Disclosed herein are embodiments of apparatuses and methods pertaining to determining whether an overstated perpetual inventory condition exists regarding an inventory level of an item for a retail setting. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein to useful to establish a wireless communication connection between a user's personal mobile device and a separate, mobile scanning circuitry or system associated with a retail store to provide the user while shopping with product information. In some embodiments, a method performed by a control circuit comprises establishing a wireless communication connection between a user's personal mobile device and a separate, mobile scanning system associated with a retail store; wirelessly receiving at the mobile device product identifying information from the scanning system of each product scanned by the scanning system and available for purchase at the retail store; associating, at the mobile device, a plurality of the product identifying information received from the scanning system with each of a plurality of user specified product information locally accessible through the mobile device; and communicating from the mobile device to a checkout system, during a checkout process, the product identifying information received from the scanning system of each product scanned by the scanning system.

Figure 1A:
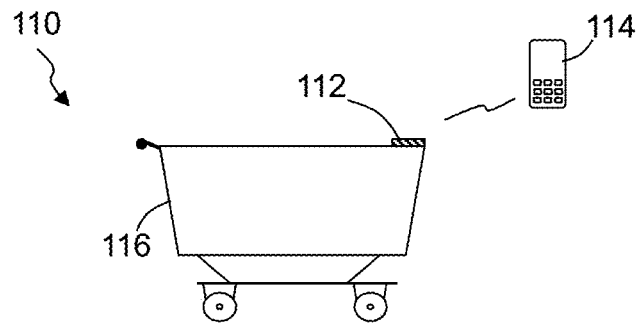
FIG. 1A illustrates an exemplary system for use in acquiring scanned product information, including a mobile scanning system 112 in wireless communication with a customer or user's personal mobile device, in accordance with some embodiments.

Referring now to FIG. 1A, an exemplary system 110 is shown including a mobile scanning system 112 in wireless communication with a customer or user's personal mobile device 114, in accordance with some embodiments. Typically, the scanning system (typically referred to below generally as a scanner) 112 is configured and intended to be taken by the user through a retail store and used to scan one or more products, and typically scan products the user intends to buy. In some implementations, the scanner 112 is cooperated with and/or mounted on a shopping cart 116, basket or the like that the user can take through the store and collect products the user intends to purchase.

In some embodiments, the scanner 112 is configured to allow a user to scan product identifying information from the products (or shelving on which the products are positioned, or other such source). The scanning can be through optical scanning of machine readable representations of data relating to the product such as an identification code (e.g., bar code, data matrix, QR code, or the like), receive radio communication from an radio frequency identification (RFID) tag, or other such scanning or combinations of such scanning of distinct products to identify and/or obtain product identifying information based on the data and/or identification code of each product scanned. For example, a user may pass a product across an optical detector on the scanner 112, and the scanner can be configured to optically scan an identification code on the product. Based on the identification code the scanner can obtain and/or determine product identifying information of the product.

Further, in some embodiments, the scanner is communicationally coupled with the user's personal mobile device 114. The communication coupling can be wired or wireless, and further can be a direct connection or connected through one or more other devices and/or networks. For example, the communication coupling can be through Bluetooth, Wi-Fi, wired and/or wireless Ethernet, ZigBee, radio frequency (RF), cellular and/or other such communication coupling. Some embodiments utilize wireless communication in compliance with one or more of the IEEE 802.11 and/or 802.15 standards.

The mobile device 114 is typically owned and controlled by the user and brought to the store by the user. Further, the store typically has no control over the mobile device other than to establish communication with the mobile device, which often includes obtaining authorization from the user before the communication is established, and optionally supplying information to the mobile device and/or obtaining information from the mobile device. The mobile device 114 can be substantially any relevant mobile consumer electronic device that allows a user to wirelessly communication with the scanner, and typically is further configured to allow the user to access servers and/or services over a network (e.g., WAN, LAN, the Internet, etc.) via wired and/or wireless communication. For example, the mobile device can be a smart phone, a tablet, a laptop and/or other such portable consumer electronic devices. Still further, in many embodiments, the mobile device is configured to operate applications, software or the like that allow the user to maintain product information, user preferences, and other relevant information.

Some embodiments provide a mobile application (APP) that is operated on the user's mobile device that allows the user to create and/or track at a budget, shopping list, wish list, user preferences, history information (e.g., previous products purchased, dates, costs, etc.), or other such relevant information, and typically a combination of two or more of such information. Furthermore, the APP can be configured to interact with the scanner 112 or the information received from the scanner, and to use the product identifying information to track what is in the shopping cart, correlate the products scanned with a shopping list, track the products scanned relative to a shopping budget, maintain a listing of products, and/or other such use of the scanned information. Additionally, as described further below, the mobile device can be configured to communicate with a checkout system to at least in part communicate the product information that has been scanned to the checkout system so that the checkout system can calculate a total cost for the products intended to be purchased. Still further, in some implementations, the mobile device communicates with the checkout system and/or a scanner linking or checkout system or service to disassociate the scanner from the mobile device.

Figure 1B:
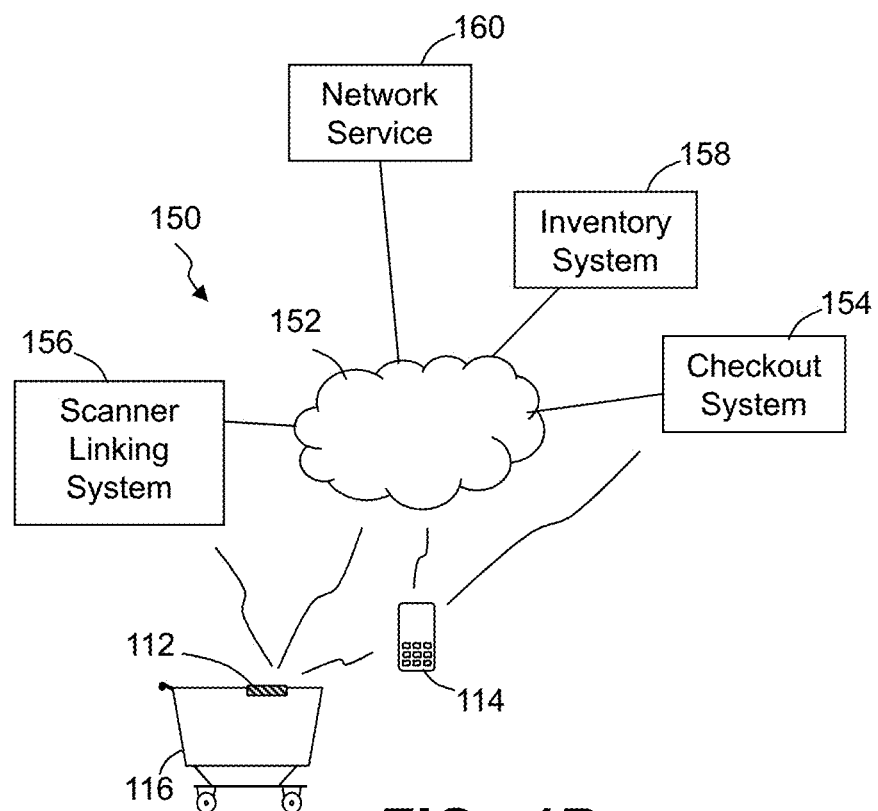
FIG. 1B shows an exemplary system configured to similarly allow a user to acquire product information in her or his personal mobile device 114 from a scanner 112, in accordance with some embodiments.

FIG. 1B shows an exemplary system 150 that similarly allows a user to acquire product information in her or his personal mobile device 114 from a scanner 112, in accordance with some embodiments. The system 150 may additionally include a distributed network 152, and a product checkout circuitry and/or system 154. Some embodiments further include a scanner linking system 156, inventory circuitry and/or system 158, remote network service 160 and other such systems. The scanner 112 is configured to wirelessly communicate directly or through the network 152 with the mobile device 114, and in some embodiments can be configured to communicate directly or through the network with one or more of the scanner linking system 156, the checkout system 154 and/or the inventory system 158. Similarly, the mobile device 114 in addition to being configured to communicate with the scanner 112 may also be configured to communicate directly or through the network 152 with one or more of the scanner linking system, the checkout system 154 and/or the inventory system 158. Again, for example, the communication coupling can be through Bluetooth, Wi-Fi, wired and/or wireless Ethernet, ZigBee, radio frequency (RF), cellular and/or other such communication coupling.

Although FIG. 1B shows the checkout system 154, the scanner linking system 156, the inventory system 158 and the network service 160 as separate components, some or all of these components may be combined into one or more systems. For example, a portion of the scanner linking system 156 may be incorporated within the checkout system 154. Similarly, a portion of the operation of the checkout system 154 may be implemented through the inventory system 158. As introduced above, the network 152 is a distributed network provided communication between two or more components and can comprise a LAN, WAN, Internet or other such network, and typically a combination of such networks.

As described above, a user may pass a product across an optical detector on the scanner 112 (or perform other scanning), and the scanner can be configured to optically scan an identification code on the product. Based on the identification code the scanner can obtain and/or determine product identifying information of the product. In some embodiments, the mobile device 114 or the scanner 112 may communicate (e.g., wirelessly communicate) with the inventory system 158 to acquire pricing information and/or other information about the scanned product.

The scanner linking system 156 is configured to establish a linking between the user's mobile device and a specific scanner 112. In some embodiments, the scanner linking system is a separate system, such as a kiosk where a user acquires a scanner and provides information to the kiosk (e.g., a phone number or other information). The kiosk provides information to the scanner and/or the mobile device to allow effective communication between the scanner and the mobile device. Similarly, in some implementations, the user can return the scanner to the kiosk to disassociate the scanner from the mobile phone.

In some embodiments, the scanner linking system is distributed between multiple components. For example, a portion of the linking system may be incorporated within the scanner 112, the checkout system and/or other components. In some embodiments, the scanner may in part implement an association or linking between the mobile device 114 and the scanner 112. Similarly, the scanner and/or the checkout system may implement a disassociation of the scanner from the mobile device.

In some embodiments, the user acquires a scanner 112 at the store and implements a linking or association process where the scanner 112 is temporarily and exclusively associated with the mobile device 114 while the user utilizes the scanner in the store. In some implementations, a linking process is initiated through an application on the mobile device and/or through the activation of an option or button on the scanner and/or through the powering up or activation of the scanner. For example, the mobile device may be configured to display a scannable identifier (e.g., a bar code or other such optically scannable code), and the scanner can be used to scan the scannable identifier of mobile device. Based on the information acquired through the scanning of the scannable identifier, the scanner is configured to wirelessly broadcast a linking communication that is intended to be received by the specific mobile device. For example, an encryption and/or encoding key may be obtained from and/or generated from the scannable identifier and used to encrypt a linking command and/or linking information that can be used to establish the communication connection between the scanner and the mobile device.

Additionally or alternatively, the scanner may communicate a scanner identifier, a key or the like to the mobile device to be used by the mobile device so that communications from the mobile device can be identified by, protected (e.g., encrypted, encoded, etc.) and/or can only be accurately received by the scanner. As such, in some implementations, the establishment of a wireless communication connection between a mobile device 114 and the scanner 112 can merely be the sharing of device identifiers, encryption keys and/or other such information so that communications can be effectively received between the mobile device and the scanner. In other embodiments, the communication connection between the mobile device and the scanner may additionally or alternatively include specifying a communication protocol, providing identifiers that are used as headers and/or other such identifiers in a communication, and/or other such communication connection.

The inventory system 158 can be configured to store product information, such as but not limited to pricing, pricing per quantity (e.g., price based on weight (e.g., per pound, per gram, per ounce, etc.), per volume (e.g., per milliliter, per ounce, etc.), per piece within a package, and/or other such quantity pricing), inventory quantities, location information (e.g., location on a shelf, location on the retail floor, location within a storage area (local or remote), combinations of such locations, etc.), discount and/or markdown information, incentive information, marketing information, ingredients information, nutritional information, Internet links to a manufacturer, distributor or the like, and/or other such relevant information, or Internet links to such information). In some embodiments, some or all of this information may be maintained by and accessed from a remote network service 160. Some of all of the network service 160 can be implemented and/or maintained by the store and/or a chain of stores, or a third party. For example, the remote network service may comprise one or more servers maintained by a store that can be accessed by the inventory system, the mobile device and/or the checkout system. Some or all of this information can be provided to and/or accessed by the mobile device. For example, upon receiving product identifying information from the scanner, the mobile device 114 can communicate with the inventory system 158 to acquire pricing information.

The checkout system 154 is configured to allow the user to purchase the products acquired while shopping in the store. In some embodiments, the mobile device 114 is configured to communicate the product information scanned through the scanner 112. Additionally or alternatively, the scanner 112 may communicate product identifying information scanned by the scanner to the checkout system. Based on the received product identifying information, the checkout system can determine a total cost for the desired products and receive payment from the user. In some instances, the checkout system may be automated such that the user interacts directly with the checkout system. In other instances, the checkout system may be manned by and/or operated by a store employee that can receive payment, and optionally may check the products relative to the product identifying information received by the checkout system relative to the products within a user's cart or basket.

In some embodiments, some of the functionality provided by the scanner linking system 156 is incorporated within the checkout system 154. For example, the scanner linking system may comprise a scanner to mobile device linking subsystem and a scanner disassociation subsystem. A user can acquire the scanner at the store and implement a linking or association process where the linking subsystem temporarily and exclusively associates the scanner 112 with the mobile device 114 while the user utilizes the scanner in the store. For example, a store employee and/or an automated system (e.g., through a kiosk) may allow the user to obtain a scanner 112 and the scanner linking system can associate the mobile device with the obtained scanner. In some embodiments, the disassociation subsystem (which in some implementations may be incorporated into the checkout system 154) can disassociate and/or check-in the scanner 112 from the mobile device 114 so that the scanner can subsequently be utilized by a different customer of the store. For example, the scanner linking system 156 can disassociate the mobile device from the scanner 112 prior to or upon completing the checking out to ensure that the scanner is unassociated with the mobile device before the user leaves the store. Additionally or alternatively, the scanner may be disassociated upon relinking to another mobile device and/or after a predefined period of time.

In some implementations, an exclusive communication coupling is established between the scanning system 112 and the mobile device 114 such that product identifying information is provided to that specific mobile device and will not communicate with or receive information from another mobile device until the exclusive coupling is disassociated or otherwise terminated.

Figure 2:
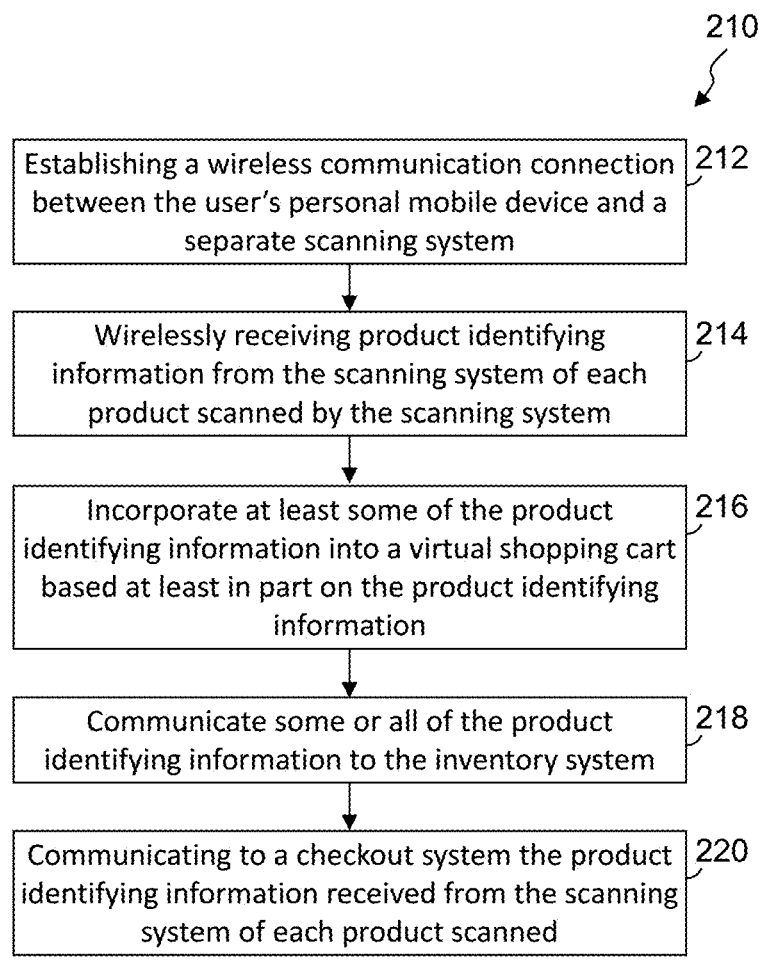
FIG. 2 shows a simplified flow diagram of an exemplary process of acquiring product information from a scanner while shopping, in accordance with some embodiments.

FIG. 2 shows a simplified flow diagram of an exemplary process 210 of acquiring product information from a scanner 112 while shopping, in accordance with some embodiments. In some embodiments, the process is implemented at least in part through control circuitry of a mobile device 114. In other embodiments, some or all of the steps may be partially or fully implemented through control circuitry or other components, such as the checkout system 154, scanner linking system 156, inventory system 158 and/or network service 160.

In step 212, a wireless communication connection is established between a user's personal mobile device 114 and a separate mobile scanning system 112 associated with a store. In some implementations, the effective wireless communication connection may be a relatively short range communication such as intended to be limited to a distance of less than about 20 feet. In some implementations the communication connection is implemented through one or more intermediary devices such as through one or more network routers of the distributed network 152 (e.g., a wired network router, wireless network router, Wi-Fi router, etc.) configured to route the communications between the scanning system and the mobile device. Again, the scanner 112 is configured to scan (e.g., optically scan) identification information and/or codes of distinct products and obtain product identifying or identification information based on the identification code of each product scanned.

In some embodiments, the mobile device 114, in establishing the communication connection, may display a unique identifier identifying the mobile device through a display of the mobile device 114. The unique identifier can be configured to be optically scanned by the scanner (or a separate scanner of a kiosk, scanned by a store employee or other such scanner) to temporarily and exclusively associate the scanner with the mobile device. The mobile device may additionally wirelessly receive, from the scanner and in response to the unique identifier being scanned, wireless communication information including a scanning system identifier. The wireless communication connection can be established using the wireless communication information. In some embodiments, the establishment of the communication connection includes a process similar to or the same as the process of establishing a network connection between two media access control (MAC) addresses. For example, the mobile device may be configured (e.g., through an APP on the mobile device) to display one or more bar codes, Quick Response (QR) codes, or the like, or a combination thereof that can be used to identify the mobile device. In some implementations the bar code, QR code or the like may include or contain a MAC address of the mobile device's network adaptor (such as a Bluetooth, Wi-Fi or other such network adaptor), or other such address or connection information. The scanner 112 (or other relevant scanner) can be configured to scan the bar code (or QR code or the like) and read or otherwise extract the MAC address, and use the MAC address to establish a network connection between a network adapter of the scanner and the network adapter of the mobile device.

In step 214, product identifying information is wirelessly received at the mobile device 114 from the scanner 112. For example, the product identifying information may be communicated from the scanner to the mobile device via Bluetooth established between the scanner and the mobile device. The scanner wirelessly communicates product identifying information of each product scanned and available for purchase at the retail store to the mobile device. In some embodiments, the product identifying information is defined within the identification code. Some product information may be stored on the scanner and acquired based on the identification information. Similarly, product information may be acquired by the mobile device 114 and/or the scanner 112 from the inventory system 158 and/or the network service 160.

In step 216, the mobile device 114 incorporates at least some of the product identifying information to a virtual electronic shopping cart or checkout list based at least in part on the product identifying information and in response to receiving the product identifying information from the scanner. In some embodiments, the virtual shopping cart is maintained and managed on the mobile device. In other instances, the mobile device may communicate with a remote system, database and/or server that maintains the virtual shopping cart. Still other embodiments operate with the mobile device maintaining the virtual shopping cart at least when the mobile device is not in communication with the remote service. The mobile virtual shopping cart may provide or display a representation or listing identifying that the product as being added into the virtual shopping cart. Further, some or all of the product identifying information and/or product information may be included in the virtual shopping cart. For example, the virtual shopping cart typically will be populated with product identifying information (e.g., a bar code number or the like) that can be used by the checkout system in determining a price and accounting for the product in determining a total checkout cost. In some embodiments the mobile device and/or the scanner is configured to communicate with the inventory system 158 to acquire product information that may be included in the virtual shopping cart and/or otherwise associated with products added to the virtual shopping cart. Additionally or alternatively, pricing information, discount information and/or other such information may also be included in the virtual shopping cart, or a reference to this information may be included. Further, in some implementations, the user may have previously defined a shopping list or populated a virtual shopping cart with one or more products. In such instances, some embodiments effectively check off or acknowledge that the product has been added to the actual shopping cart such that those products that have actually and physically been acquired by the user are provided to a checkout system.

In some embodiments, the mobile device (e.g., through the APP) associates the plurality of the product identifying information received from the scanner 112 with each of a plurality of user specified product information locally accessible through the mobile device. Again, as described above, the user may define a shopping list, identify products of interest, and/or otherwise specify one or more products that the user wants to and/or intends to purchase. In some embodiments, the user selects products and/or generates a shopping list through the network service 160 or other remotely accessed server associated with the retail store or chain of stores and/or product distributers, manufacturers or the like. For example, the user may access through the mobile device 114 or through another device (e.g., home computer, laptop, etc.) an Internet site managed by the store, a chain of stores, one or more distributers, etc., and select products in defining a shopping list and/or product list. In other instances, an APP on the mobile device may allow a user to select specific products (e.g., specific sized box of a specific cereal from a specific company) or a type of product (e.g., generally select "cereal", "flake cereal"). The APP may access a local listing of products and/or may access one or more remote sources (e.g., the network service 160) from which the user can select.

Based on the user generated list, the mobile device may associate scanned products with those in the listing. In some embodiments, the mobile device displays a user defined shopping list on a display of the mobile device and further associates the product identifying information with the user defined product information by in part indicating within that displayed list the one or more products from the shopping list that have been scanned by the scanner 112. Additionally or alternatively, the mobile device 114 may calculate a cost and/or adjust a budget based on product cost information. As described above, the cost information may be received from the scanner 112, the inventory system 158, the checkout system 154 or other source. Accordingly, some embodiments are configured to determine, through the mobile device, a cost of one or more products and adjust a remaining budget based on the cost of the one or more products. Other evaluations and/or associations can be performed by the mobile device based on the product identifying information and/or product information. Further, in some embodiments, the mobile device (or scanner) is configured to utilize the product identifying information to obtain detailed product information allowing the user to scan an item and check the price, obtain detailed or rich product information, or other such information or combinations of such information. For example, upon obtaining the product identifying information of a laptop, the mobile device can communicate with the inventory system to acquire detailed product information (e.g., the display resolution, the memory and CPU spec's, storage space, etc.).

Some embodiments include step 218 where the mobile device and/or the scanner communicate some or all of the product identifying information to the inventory system 158.

Accordingly, in some embodiments, the inventory system 158 takes advantage of the scanned information to track products and product inventory. For example, the mobile device can be configured to communicate some or all of the product identifying information of each product scanned by the scanner 112 to the remote inventory system 158 associated with the retail store notifying the inventory system that a product corresponding to the product identifying information has been removed from a product shelf within the retail store or otherwise expected to be purchased by the user (e.g., is placed into the user's basket and not available to be purchased by another customer). As such, the inventory system 158 can make appropriate updates to inventory information. Further, the inventory system has knowledge of the product being unavailable for other customers and can take appropriate action when needed. For example, the inventory system may identify that the number of a particular product on the shelves is below a threshold, the last product of a type of product has been removed from the shelf, or other such evaluation. This allows the inventory system to obtain and track inventory information before the user actually checks out, which allows the store to take appropriate action. This can be particularly advantageous when a user spends a relatively large amount of time shopping in the store and the inventory system would otherwise be unaware of the current inventory status for that relatively large amount of time until the user checks out. Accordingly, in some embodiments, the mobile device communicates the product identifying information to the inventory system in response to receiving the product identifying information or shortly thereafter, and in many implementations before communicating the product identifying information from the mobile device to the checkout system.

In step 220, the mobile device 114 communicates some or all of the product identifying information received from the scanner 112 of each product scanned to the checkout system 154 during a checkout process. For example, in some embodiments, the information in the virtual shopping cart is communicated to the checkout system 154. The checkout system can then calculate a total, including applying any discounts, rebates and the like, to be paid by the user. The checkout process may be activated by the user, for example, through an application by the user selecting a "checkout" option. In other implementations the user activates the checkout process on the checkout system by selecting an option (e.g., "start" option) provided to the user (e.g., displayed on a touch screen) at the checkout system.

In some embodiments, the checkout process can be initiated by communicating a request to disassociate the scanner 112 from the mobile device 114. In some instances, this disassociation request is communicated to the checkout system 154. In response, the checkout system or other system receiving the disassociation request can disassociate the particular scanner 112 from the specific mobile device. A confirmation may be received at the mobile device 114 that the scanner has been disassociated from the mobile device. Further, in some implementations, the mobile device may prevent completing the checkout or may prevent the checkout from proceeding further until the confirmation is received. For example, some embodiments initiate the communication of the product identifying information from the mobile device 114 to the checkout system 154 during the checkout process in response to the mobile device receiving the confirmation the scanning system has been disassociated from the mobile device.

In some embodiments the disassociation process is initiated in response to the user initiating checkout and/or the checkout system receiving the product information (e.g., product information from the virtual shopping cart) communicated from the mobile device 114. For example, the association of the scanner to the user may comprise the association of the scanner with the user's virtual shopping cart or basket. In some implementations, the mobile device disassociates from the scanner in response to transferring the virtual shopping cart (or relevant information from the virtual shopping cart) to the checkout system (e.g., after receiving a confirmation from the checkout system that at least the relevant information from the virtual shopping cart was received by the checkout system). In some implementations, a mobile application on the mobile device can be configured to perform a network disassociation on the mobile device. For example, an APP can call a process or method that is configured to connect and disconnect Bluetooth devices. Additionally or alternatively, an event or notice could be communicated to the scanner (e.g., from the mobile device through the Bluetooth connection; from the mobile device, checkout system or other system through a Wi-Fi network connection; or the like) that can trigger the scanner to disconnect. Similarly, a customer service associate of the store can initiate the disassociation (e.g., using one of the methods described above). This may be advantageous when the check in or association between the scanner and the mobile device process is performed in a different part of the store than the part of the store where the check-out process occurs. Rather than using the register to trigger the event, the store associate could implement the disassociation, for example, by scanning a QR bar code across the scanner which would trigger the disconnect.

Figure 3:
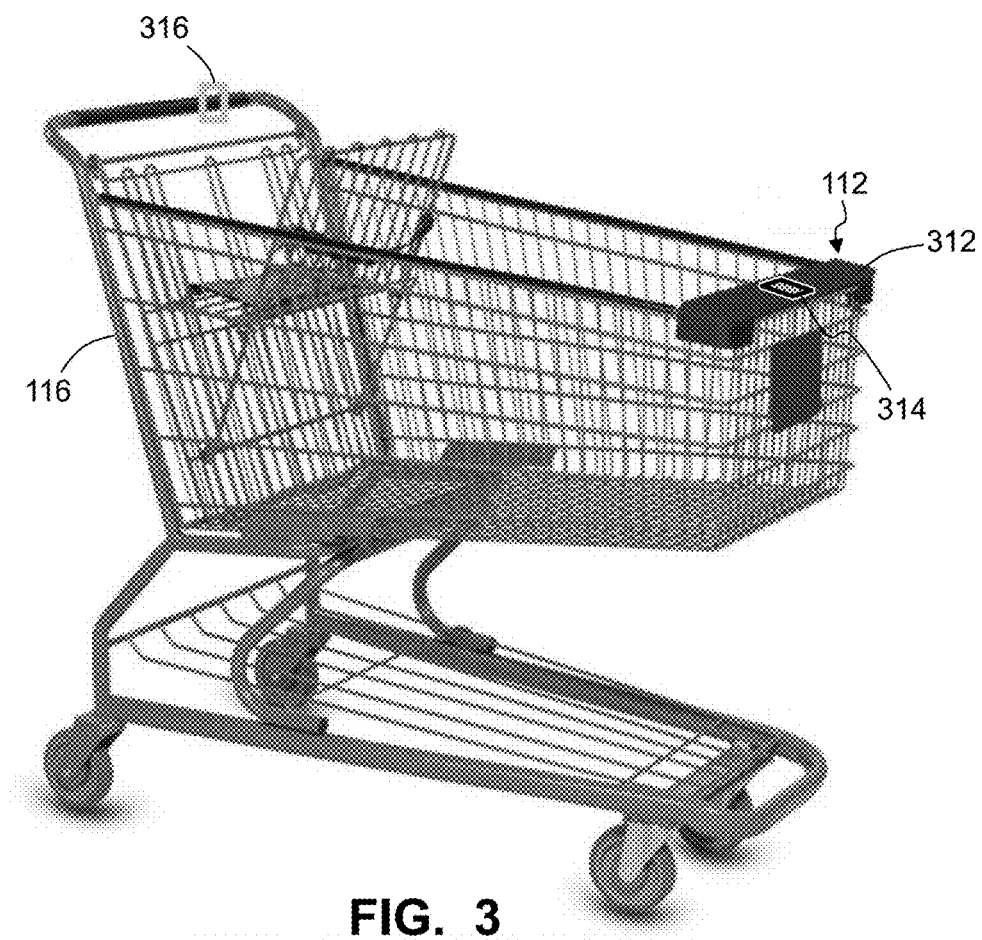
FIG. 3 shows a perspective view of an exemplary scanner cooperated with a shopping cart, in accordance with some embodiments.

FIG. 3 shows a perspective view of an exemplary scanner 112 cooperated with a shopping cart 116, in accordance with some embodiments. In some implementations, the scanner 112 is configured to be positioned onto the cart so that the user does not have to hold the scanner while scanning a product and/or can scan a product when only one hand is free to hold the product. For example, the scanner 112 may extend across the cart proximate a front end of the cart. In many embodiments the scanning system 112 employs an internal optical scanner positioned within a housing 312. A transparent scanning window 314 may be positioned over the internal scanner to protect the internal scanner. The scanning window and/or markings may act as a target for the user to scan the products. In some embodiments, a mobile device holder or mount 316 may additionally be provided on the cart 116 to allow the user to place the mobile device to be visible while leaving the user's hands free. For example, the mobile device holder 316 can be attached to the cart handle using one or more clamps or the like. The mobile device holder can be configured to accommodate different sized user devices (e.g., provides flexible arms that will securely hold different sized devices), and provides a stable platform where bumps or shakes of the cart 116 do not dislodge the mobile device 114. Further, the scanner 112 can include one or more power and/or communication ports, such as a USB port or other such port that allows the scanner to be plugged into a power source and/or communication network (e.g., network 152).

Further, in some embodiments the scanner 112 and/or the housing 312 includes mounting structures, such as but not limited to one or more latches, snaps, biased or spring loaded catches, tabs, brackets, ridges, ledges, straps, locking structures, or the like that allow the scanner to be removably cooperated and/or mounted with the shopping cart. In some embodiments, the mounting structure(s) may be configured to allow the scanner to be readily mounted and removed, for example, so that the scanner is mounted by the user and removed by the user when done with the scanner (e.g., after disassociation from the mobile device). In other instances, the mount structure is configured to securely mount the scanner to the cart to make it difficult to remove from the cart (e.g., special tools are needed to remove the scanner). In many embodiments, however, the scanner 112 is not integrated with the shopping cart. For example, the scanner 112 may be removably mounted on a front of the cart 116, with a bar code scanner encased within a flat mount. The scanning system can be encased in the housing 312 (e.g., a plastic shell) that can be attached to the cart 116. The scanning window 314 is positioned (e.g., on a top or front of the housing 312) to allow a scan beam to pass through and impinge on products as they are positioned relative to the scanning window 314.

Further, in some implementations, the scanner and/or housing is configured with one or more brackets, ridges, ledges, snaps, tabs, or the like to be readily cooperated with a storage structure or rack at the store so that the scanner can be stored when not in use. Similarly, the storage rack may include a power connect that electrically couples with the scanner to charge a rechargeable battery or other such electrical storage device. Additionally or alternatively, the storage rack may include a communications bus that communicationally couples with the scanner when positioned with the storage rack. This communication bus allow a system controller, the inventory system 158, the checkout system 154, the scanner linking system 156, the network service 160 and/or other devices to communication with the scanner to acquire information from the scanner or provide information to the scanner, such as product identifying information, other product information, upgrading firmware and/or software on the scanner, link a user's mobile device 114 with a scanner and/or other such communications. In some embodiments, the scanner is battery powered with a batter power pack internal to the housing. Additionally or alternatively, in some implementations, a battery power pack may be installed on the cart (e.g., on a front or bottom of the cart). The battery or battery pack can be removed for recharging but also locked so that it reduces potential theft or tampering. The battery of the scanner and/or a separate battery mounted on the cart can be configured to allow the scanner to operate for multiple hours (e.g., 5, 10, 24 hours) and/or multiple days of active scanning time. In some embodiments, the scanner shifts to a lower power or sleep mode until activated. It is noted that the scanner 112 is shown as connected to the cart; however, the scanner is not restricted to being fixed to the cart. In other embodiments, the scanner may be a scanner the user can move to scan a product (e.g., a gun style scanner). For example, the cart may include a holder to hold the scanner allowing the user to move products past the scanner or to move the scanner to scan a product. Further, as described above, the scanner may be configured to temporarily be cooperated with the cart and be easily and readily removed by the user or a store associate (e.g., a locking mechanism locks upon association with a mobile device and unlocks upon disassociation from the mobile device).

Accordingly, some embodiments are configured to allow a customer to enter a store, obtain a scanner 112, and obtain a cart (or basket, or the like) out of the cart bin. The user links her/his mobile device 114 with the scanner 112. In some instances, for example, the user can activate an application or other software on her/his mobile device (e.g., start an electronic virtual shopping cart APP). The application or the like can wirelessly link the mobile device and/or the application (e.g., using Bluetooth and configured to communicate using the Bluetooth networking protocol) with the scanner 112, which can be fixed with and/or user attached to the cart 116. As the user shops the store, she/he scans the desired products using the scanner (e.g., as the user places the items into the cart). The scanner communicates the product identifying information (e.g., global trade identification (GTIN), UPC, etc.) to the user's mobile device 114. Further, in some embodiments, an application operating on the mobile device may automatically add the scanned product to her/his virtual shopping cart. When the user is done shopping, she/he can cause the mobile device to electronically send product information (e.g., product identifying information, pricing, etc.) to the checkout system 154. For example, the user can trigger a checkout option in an APP on the mobile device causing the mobile device to communicate an electronic shopping basket to a self checkout register, which in turn determines a total (can apply any discounts, coupons, and/or can allow the user to perform other activates), and the user pays for the merchandise.

Figure 4:
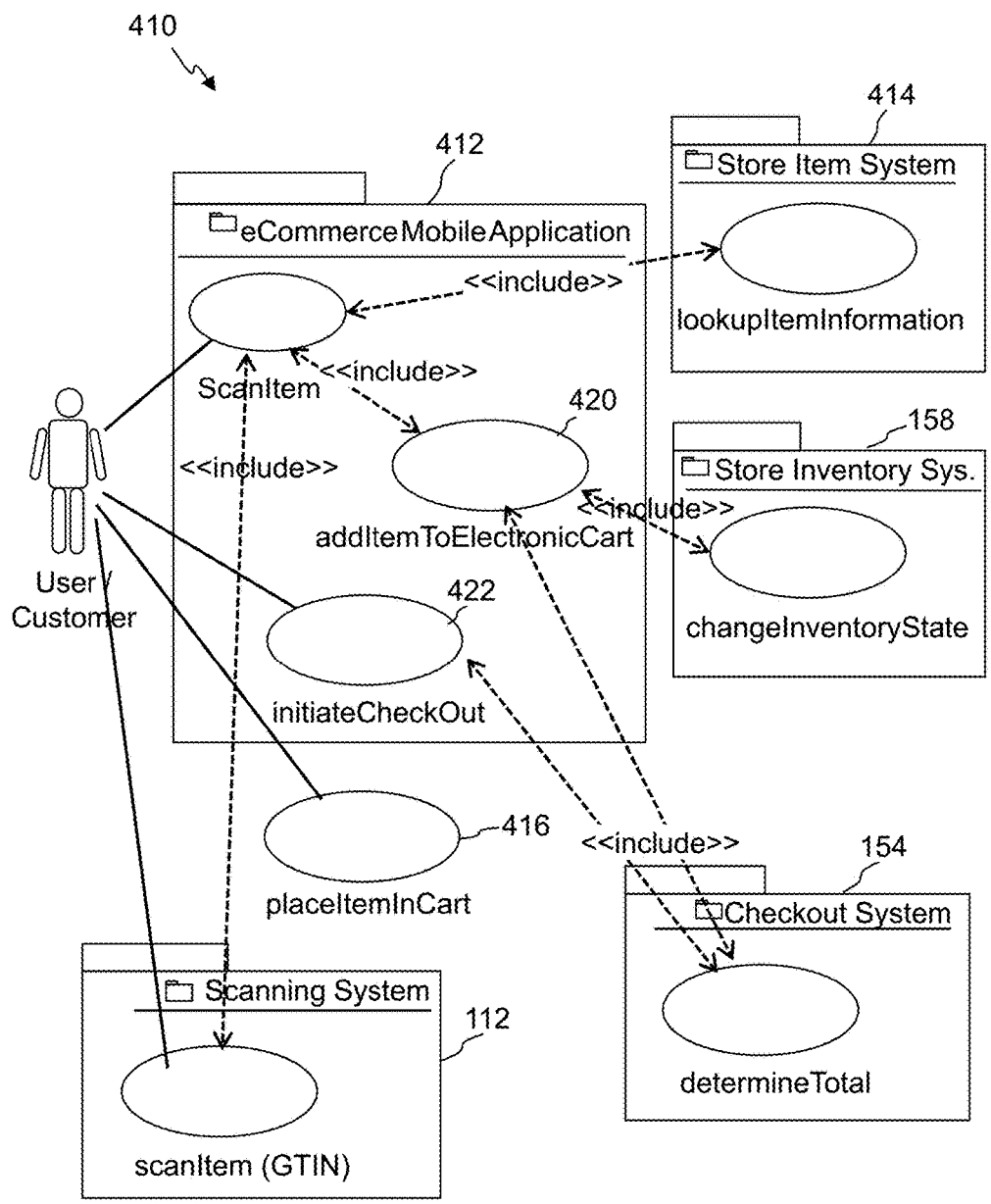
FIG. 4 shows a simplified, exemplary logic representation of shopping system, in accordance with some embodiments.

FIG. 4 shows a simplified, exemplary logic representation of shopping system 410, in accordance with some embodiments. The system 410 is configured to leverage and expand mobile ecommerce solutions and/or applications utilized by users on their mobile devices 114. In some embodiments, the system includes one or more mobile applications 412 operated on a user's mobile device. The mobile application 412, through the mobile device, is in communication with a store inventory system 158, and in some implementations with a product information system or store item system 414, which may be part of, separate from and/or in communication with the inventory system 158, the network service 160 and/or the checkout system 154.

The user scans through the scanner 112 one or more products 416. The scanner provides product identifying information to the mobile application 412. For example, the mobile application 412 is configured to accept a global trade identification (GTIN) scan from the scanner 112. In some embodiments, the mobile application takes advantage of functionality of a mobile application configured to accept a GTIN scan from a camera on the mobile device. As such, the mobile application 412 can be expanded to also accept the scan of the product identifying information (e.g., a GTIN bar-code and/or corresponding information) from the scanner 112 (which is often mounted on a cart 116). For example, the scanner 112 electronically sends (e.g., wirelessly via Bluetooth, Wi-Fi, etc.) the GTIN bar-code information to the ecommerce mobile application 412. The mobile application can be configured to communicate (e.g., via Wi-Fi, cellular, etc.) with the store item system 414 and provide the product identifying information to the store item system. Based on the product identifying information (e.g., GTIN) the store item system 414 can obtain and supply more detailed product information to the mobile device, for example, through the mobile application 412. The mobile application 412 can further add the identified product to an electronic virtual shopping cart 420.

In some embodiments, the mobile device 114 (e.g., through the mobile application 412) further communicates with the inventory system 158 of the store. This can be performed in response to receiving the scanned product identifying information and/or adding a product into the mobile electronic virtual shopping cart 420 (e.g., the application can perform a service call to the store inventory system 158 reflecting that an item has been placed into a cart 116 and that it is no longer on the shelf). Some embodiments further provide the user with a checkout option and/or application 422. When the user is ready to check out, she/he can activate the communication of some or all of the product identifying information from the electronic virtual shopping cart 420 to the checkout system 154. The checkout system can calculate a total and obtain payment for the products selected. Accordingly, some embodiments simplify a customer's usage of a mobile application 412 and/or mobile virtual shopping cart 420 when physically shopping in stores, while typically improving a mobile virtual shopping cart using higher quality and/or more accurate scanning equipment than a camera of a mobile device. This can improve the customer experience and/or provide a faster solution, which can improve adoption of the system 110, 410. Further, some embodiments improve inventory visibility by enhancing on shelf availability of inventory.

As described above, in some embodiments, the scanner 112 can be attached to the physical cart 116, and wirelessly couple with the user's mobile device 114 (e.g., an Xperia, Android smartphone, iPhone, iPad, and/or other such devices) using one or more wireless communication and/or network protocols (e.g., Wi-Fi, Bluetooth, etc.). Again, the mobile device 114 may include an already loaded ecommerce mobile application 412, which can be configured to leverage an in-store wireless communication systems (e.g., using a Wi-Fi, 802.11, etc.) wireless network protocol. Some or all of the store item system 414 and the store inventory system 158 may be operated locally at the store, while some or all of the store item system 414, the store inventory system 158 and/or the network services 160 may be may be operated remotely through one or more other systems at one or more other locations (e.g., operated within a corporate private and/or public cloud) hosting some or all of the store item system 414, the store inventory system 158, and/or network service 160.

Figure 5:
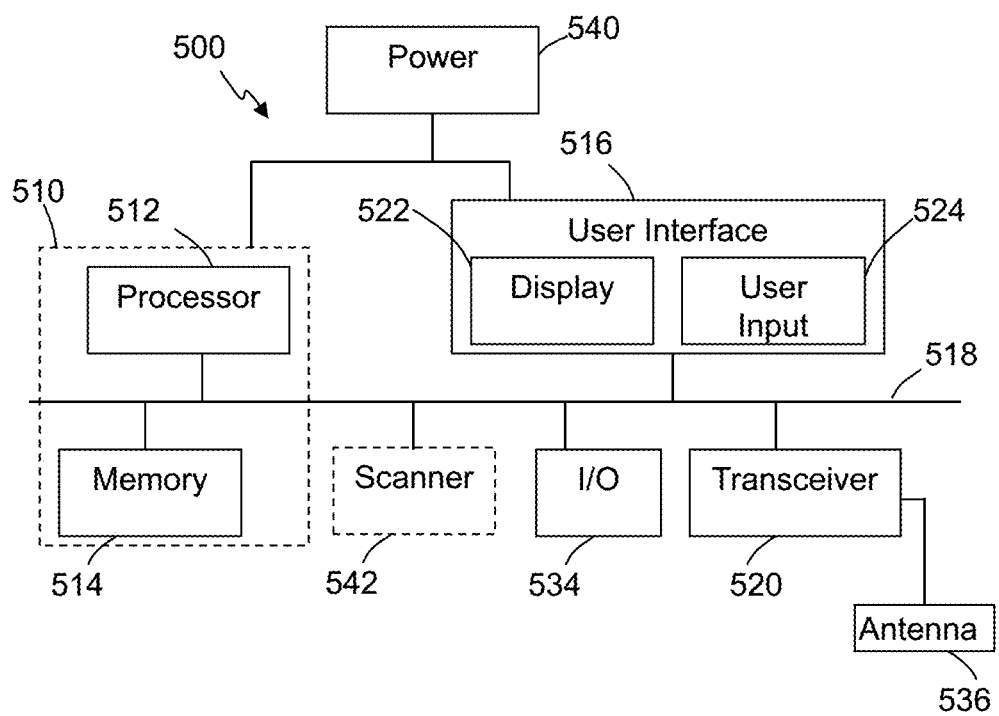
FIG. 5 illustrates an exemplary system for use in implementing methods, techniques, devices, apparatuses, systems, servers, sources and the like in providing user with scanned product information in accordance with some embodiments.

The methods, techniques, systems, devices, services, servers, sources and the like described herein may be utilized, implemented and/or run on many different types of devices and/or systems. Referring to FIG. 5, there is illustrated an exemplary system 500 that may be used for any such implementations, in accordance with some embodiments. One or more components of the system 500 may be used for implementing any circuitry, system, apparatus or device mentioned above or below, or parts of such systems, apparatuses or devices, such as for example any of the above or below mentioned scanning system 112, mobile device 114, checkout system 154, scanner linking system 156, inventory system 158, network service 160, and the like. However, the use of the system 500 or any portion thereof is certainly not required.

By way of example, the system 500 may comprise a controller or processor module, memory 514, a user interface 516, and one or more communication links, paths, buses or the like 518. A power source or supply 540 is included or coupled with the system 500. The controller 512 can be implemented through one or more processors, microprocessors, central processing unit, logic, local digital storage, firmware and/or other control hardware and/or software, and may be used to execute or assist in executing the steps of the processes, methods and techniques described herein, and control various communications, programs, content, listings, services, interfaces, etc. Further, in some embodiments, the controller 512 can be part of control circuitry and/or a control system 510, which may be implemented through one or more processors with access to one or more memory 514. The user interface 516 can allow a user to interact with the system 500 and receive information through the system. In some instances, the user interface 516 includes a display 522 and/or one or more user inputs 524, such as a buttons, touch screen, track ball, keyboard, mouse, etc., which can be part of or wired or wirelessly coupled with the system 500.

Typically, the system 500 further includes one or more communication interfaces, ports, transceivers 520 and the like allowing the system 500 to communication over a communication bus, a distributed network, a local network, the Internet, communication link 518, other networks or communication channels with other devices and/or other such communications or combinations thereof. Further the transceiver 520 can be configured for wired, wireless, optical, fiber optical cable or other such communication configurations or combinations of such communications. Some embodiments include one or more input/output (I/O) ports 534 that allow one or more devices to couple with the system 500. The I/O ports can be substantially any relevant port or combinations of ports, such as but not limited to USB, Ethernet, or other such ports.

In some embodiments, the system 500 includes an internal scanner 542. The scanner can be an optical scanner, a radio frequency scanner or other such relevant scanner. As described above, the internal scanner 542 can be configured to scan product identifying information. The information can be provided to the controller 512, stored in memory 514 and/or communicated (e.g., via transceiver 520 and/or I/O port 534) to one or more other devices.

The system 500 comprises an example of a control and/or processor-based system with the controller 512. Again, the controller 512 can be implemented through one or more processors, controllers, central processing units, logic, software and the like. Further, in some implementations the controller 512 may provide multiprocessor functionality.

The memory 514, which can be accessed by the controller 512, typically includes one or more processor readable and/or computer readable media accessed by at least the controller 512, and can include volatile and/or nonvolatile media, such as RAM, ROM, EEPROM, flash memory and/or other memory technology. Further, the memory 514 is shown as internal to the system 510; however, the memory 514 can be internal, external or a combination of internal and external memory. Similarly, some or all of the memory 514 can be internal, external or a combination of internal and external memory of the controller 512. The external memory can be substantially any relevant memory such as, but not limited to, one or more of flash memory secure digital (SD) card, universal serial bus (USB) stick or drive, other memory cards, hard drive and other such memory or combinations of such memory. The memory 514 can store code, software, executables, scripts, data, content, lists, product information, pricing, multimedia content, programming, programs, media stream, media files, textual content, identifiers, log or history data, user information and the like.

One or more of the embodiments, methods, processes, approaches, and/or techniques described above or below may be implemented in one or more computer programs executable by a processor-based system. By way of example, such a processor based system may comprise the processor based system 500, a computer, a server, a smart phone, a table, a laptop, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for obtaining product information and associate the product information with user defined product information. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: by a control circuit, establishing a wireless communication connection between a user's personal mobile device and a separate, portable scanning system associated with a retail store, wherein the scanning system is configured to optically scan identification codes of distinct products and obtain product identifying information based on the identification code of each product scanned; wirelessly receiving at the mobile device product identifying information from the scanning system of each product scanned by the scanning system and available for purchase at the retail store; associating, at the mobile device, a plurality of the product identifying information received from the scanning system with each of a plurality of user specified product information locally accessible through the mobile device; and communicating from the mobile device to a checkout system, during a checkout process, the product identifying information received from the scanning system of each product scanned by the scanning system.

In some embodiments, systems, apparatuses and methods are provided herein useful to obtain product information through scanning. In some embodiments, a method performed by a control circuit comprises establishing a wireless communication connection between a user's personal mobile device and a separate, portable scanning system associated with a retail store, wherein the scanning system is configured to optically scan identification codes of distinct products and obtain product identifying information based on the identification code of each product scanned; wirelessly receiving at the mobile device product identifying information from the scanning system of each product scanned by the scanning system and available for purchase at the retail store; associating, at the mobile device, a plurality of the product identifying information received from the scanning system with each of a plurality of user specified product information locally accessible through the mobile device; and communicating from the mobile device to a checkout system, during a checkout process, the product identifying information received from the scanning system of each product scanned by the scanning system.

In some embodiments, an apparatus is provided comprising: a control circuit; a memory coupled to the control circuit and storing computer instructions that when executed by the control circuit perform the follows steps: establish a short range wireless communication connection between a user's personal mobile device and a separate scanning system associated with a retail store, wherein the scanning system is configured to optically scan distinct products and identify product identifying information based on the scan of each product scanned; wirelessly receive at the mobile device product identifying information from the scanning system of each product scanned by the scanning system and available for purchase at the retail store; associate, at the mobile device, each of the product identifying information received from the scanning system with user defined product information locally accessible through the mobile device; and communicating from the mobile device to a checkout system, during a checkout process, the product identifying information received from the scanning system of each product scanned by the scanning system.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A customer controlled retail store shopping system, comprising:

a control circuit;

a memory coupled to the control circuit and storing computer instructions that when executed by the control circuit perform the follows steps:

establish a wireless communication connection between a user's personal mobile device and a separate portable scanning system associated with a retail store, wherein the scanning system is configured to optically scan identification codes of distinct products and obtain product identifying information based on the identification code of each product scanned;

wirelessly receive at the mobile device product identifying information from the scanning system of each product scanned by the scanning system and available for purchase at the retail store;

incorporate at least some of the product identifying information into a virtual shopping cart based at least in part on the product identifying information;

communicating from the mobile device to a checkout system, during a checkout process, the product identifying information in the virtual shopping cart and received from the scanning system of each product scanned by the scanning system; and a display of the mobile device coupled with the control circuit;

wherein the control circuit, in establishing the short range wireless communication connection between the mobile device and the scanning system, is further configured to:

cause a unique identifier to be displayed on the display, wherein the unique identifier identifies at least the mobile device and is configured to be optically scanned by the scanning system to cause a temporary and exclusive association between the scanning system with the mobile device;

wirelessly receive, from the scanning system and in response to the unique identifier being scanned, wireless communication information including a scanning system identifier; and establish the wireless communication connection using the wireless communication information.

2. The system of claim 1 wherein the control circuit and memory are located on the mobile device.

3. The system of claim 1 wherein the control circuit is configured to communicate from the mobile device, in response to receiving the product identifying information and before the communicating the product identifying information from the mobile device to the checkout system, the product identifying information of each product scanned by the scanning system to a remote inventory system associated with the retail store and notifying the inventory system that a product corresponding to the product identifying information has been removed from a product shelf within the retail store.

4. The system of claim 1, wherein the control circuit is configured to associate, at the mobile device, a plurality of the product identifying information received from the scanning system with each of a plurality of user specified product information locally accessible through the mobile device.

5. The system of claim 4 further comprising:
a display of the mobile device coupled with the control circuit;
wherein the control circuit, in associating the product identifying information with the user defined product information, is further configured to indicate, in a user defined shopping list displayed on the display of the mobile device, one or more products from the shopping list that have been scanned by the scanning system.

6. The system of claim 4 wherein the control circuit, in associating the product identifying information with the user defined product information, is further configured to determine a cost of a first product and adjusting a remaining budget stored in the memory based on the cost of the first product.

7. The system of claim 1 wherein the control circuit is further configured to:
communicate a request to disassociate the scanning system from the mobile device;
receive confirmation at the mobile device that the scanning system has been disassociated from the mobile device; and
initiate the communication of the product identifying information from the mobile device to the checkout system after receiving the confirmation that the scanning system has been disassociated from the mobile device.

8. A method comprising:
by a control circuit,
establishing a wireless communication connection between a user's personal mobile device and a separate, portable scanning system associated with a retail store, wherein the scanning system is configured to optically scan identification codes of distinct products and obtain product identifying information based on the identification code of each product scanned;
wirelessly receiving at the mobile device product identifying information from the scanning system of each product scanned by the scanning system and available for purchase at the retail store;
incorporating at least some of the product identifying information into a virtual shopping cart based at least in part on the product identifying information; and
communicating from the mobile device to a checkout system, during a checkout process, the product identifying information in the virtual shopping cart and received from the scanning system of each product scanned by the scanning system;
wherein the establishing the short range wireless communication connection between the mobile device and the scanning system comprises:
displaying, through a display of the mobile device, a unique identifier identifying at least the mobile device, wherein the unique identifier is configured to be optically scanned by the scanning system to temporarily and exclusively associate the scanning system with the mobile device;
wirelessly receiving, from the scanning system and in response to the unique identifier being scanned, wireless communication information including a scanning system identifier; and
establishing the wireless communication connection using the wireless communication information.

9. The method of claim 8, wherein the establishing the wireless communication connection between the mobile device and the separate scanning system comprises establishing a short range wireless communication connection having an intended effective communication distance of less than 20 feet.

10. The method of claim 8, wherein the establishing the wireless communication connection comprises establishing the wireless communication connection through a wireless network router configured to route the communications between the scanning system and the mobile device.

11. The method of claim 8, further comprising:
communicating from the mobile device, in response to receiving the product identifying information and before the communicating the product identifying information from the mobile device to the checkout system, the product identifying information of each product scanned by the scanning system to a remote inventory system associated with the retail store and notifying the inventory system that a product corresponding to the product identifying information has been removed from a product shelf within the retail store.

12. The method of claim 8, further comprising:
associating, at the mobile device, a plurality of the product identifying information received from the scanning system with each of a plurality of user specified product information locally accessible through the mobile device.

13. The method of claim 12, wherein the associating the product identifying information with the user defined product information comprises indicating, in a user defined shopping list displayed on the mobile device, one or more products from the shopping list that have been scanned by the scanning system.

14. The method of claim 12, wherein the associating the product identifying information with the user defined product information comprises determining, through the mobile device, a cost of a first product and adjusting a remaining budget based on the cost of the first product.

15. The method of claim 8, further comprising:
communicating a request to disassociate the scanning system from the mobile device;
receiving confirmation at the mobile device that the scanning system has been disassociated from the mobile device; and
initiating the communicating the product identifying information from the mobile device to the checkout system after receiving the confirmation that the scanning system has been disassociated from the mobile device.

* * * * *